(12) United States Patent
Massiera et al.

(10) Patent No.: US 7,990,875 B2
(45) Date of Patent: Aug. 2, 2011

(54) TELECOMMUNICATIONS SYSTEM AND METHOD

(75) Inventors: Annelise Massiera, Fontenay-aux-Roses (FR); Servane Bonjour, Acigne (FR); Stéphane Atheo, Heric (FR)

(73) Assignee: France Telecom, Paris (FR)

(*) Notice: Subject to any disclaimer, the term of this patent is extended or adjusted under 35 U.S.C. 154(b) by 377 days.

(21) Appl. No.: 11/721,254

(22) PCT Filed: Dec. 2, 2005

(86) PCT No.: PCT/EP2005/013051
§ 371 (c)(1),
(2), (4) Date: Jun. 8, 2007

(87) PCT Pub. No.: WO2006/061184
PCT Pub. Date: Jun. 15, 2006

(65) Prior Publication Data
US 2008/0192638 A1  Aug. 14, 2008

(30) Foreign Application Priority Data
Dec. 8, 2004 (EP) ................................. 04292921

(51) Int. Cl.
*G08C 15/00* (2006.01)
(52) U.S. Cl. ..... 370/237; 370/234; 370/252; 370/395.5; 709/226; 709/227; 709/246
(58) Field of Classification Search ............... 370/234, 370/252, 395.5; 375/E7.155; 709/226–227, 709/246
See application file for complete search history.

(56) References Cited

U.S. PATENT DOCUMENTS

| | | | |
|---|---|---|---|
| 7,171,215 B2 * | 1/2007 | Khouaja et al. ............ 455/452.2 |
| 2003/0193910 A1 * | 10/2003 | Shoaib et al. ................. 370/331 |
| 2004/0203796 A1 * | 10/2004 | Dunlop et al. ................ 455/445 |
| 2004/0228291 A1 * | 11/2004 | Huslak et al. ................. 370/260 |
| 2006/0095944 A1 * | 5/2006 | Demircin et al. ............... 725/81 |
| 2007/0005804 A1 * | 1/2007 | Rideout ....................... 709/246 |

FOREIGN PATENT DOCUMENTS

| | | | |
|---|---|---|---|
| EP | 1435748 A1 * | 7/2004 |
| FR | WO 03/047296 A1 | 6/2003 |
| WO | WO 01/72076 | * | 3/2001 |
| WO | WO 01/69961 A1 | 9/2001 |
| WO | WO 01/72076 A1 | 9/2001 |
| WO | WO 0169961 | * | 9/2001 |
| WO | WO 0172076 | * | 9/2001 |

* cited by examiner

*Primary Examiner* — Robert W Wilson
*Assistant Examiner* — Mohamed Kamara
(74) *Attorney, Agent, or Firm* — Thorne & Halajian, LLP; Gregory L. Thorne

(57) ABSTRACT

A telecommunications system provides mobile internet protocol related communications services to mobile nodes via a plurality of access networks that each include an access gateway, a mobility manager operable to receive link quality messages from the mobile nodes providing an indication of a currently available link quality from an access network with which the mobile node is currently affiliated. The mobility manager is also operable to receive application server messages from the application server for managing the communications service with respect to the communications session level. The mobility manager directs a change of affiliation of a first mobile node between one of a first of the access networks and a second of the access networks to the other of the first and second access networks, or a change of communications session level of the first mobile node.

11 Claims, 7 Drawing Sheets

TELECOMMUNICATIONS SYSTEM AND METHOD

FIELD OF THE INVENTION

The present invention relates to telecommunications systems and methods and to a mobility manager operable within a telecommunications system to provide mobile internet protocol related services to mobile nodes via a plurality of access networks.

BACKGROUND OF THE INVENTION

There are various types of mobile radio networks with which mobile related services can be provided to mobile user equipment. For example, Global System for Mobiles (GSM) networks provide a facility for data and voice communications via fixed capacity radio communications channels. The Universal Mobile Telecommunications System (UMTS) on the other hand provides improved flexibility in affording greater data rates to mobile user equipment whilst still providing a roaming facility made possible by a cellular architecture. On the other hand the Wireless Local Area Networks (WLAN) standards for example IEEE 802.11B referred to as WIFI provide a facility for high data rate communications within so called WLAN hotspots. Such WLANs provide a substantially greater data rate than can be provided through cellular mobile radio architectures such as GSM and UMTS. Furthermore, WLANs are often unregulated in that a single mobile user can occupy a greater proportion of the available data communications bandwidth than another mobile user.

Many applications utilize an internet protocol to support data communication such as for example multi-media services. As such, a communication service may be provided by communicating internet protocol packets via a variety of different networks. The application may not be aware of the type of network via which the internet protocol packets are being communicated. Thus, in the case of wireless communications the application may communicate internet packets via either a GSM network or a WLAN. However, since these different types of mobile radio networks offer substantially different communications bandwidths, a quality of service which can be supported will be different in accordance with the communications bandwidth provided by the mobile access network. As such, a communications service may be provided using different communications session levels, each level providing a different quality of service as determined by the access network via which the mobile node is currently communicating. For each communications session level, different types of media may be communicated. Thus for example, for one communications session level video may be supported, whereas another level may only support audio.

European patent EP 1 435 748 discloses a telecommunications system in which a mobility manager is arranged to inform an applications server providing a communications service to a mobile node of a pending or completed change of affiliation of the mobile node from one access network to another. The application server can therefore change a communications session level before or after the change of affiliation depending on whether there is an increase or a decrease in communications session level. The communications session levels provide different a service qualities, which can support different types of media. The application server can therefore adapt the communications session level to the effect of maintaining at least one service to which a user has subscribed. In order to determine when a change of affiliation may occur, the mobility manager receives access network evaluation messages from access gateways of the mobile access networks concerned, to identify when a hand-over may occur.

SUMMARY OF INVENTION

According to an aspect of the present invention, a telecommunications system provides mobile internet protocol related communications services to mobile nodes via a plurality of access networks. Each of the access networks includes an access gateway for controlling access by the mobile nodes to the access networks, the communications services being provided within internet protocol communications sessions having different levels. The system comprises a mobility manager server including an application layer mobility manager operable to receive link quality evaluation messages (MNE) from the mobile nodes, a message (MNE) from a mobile node containing one or several measurements each providing an indication of a link quality available for the mobile node on an access network. The mobility manager is also operable to receive application server messages from an application server providing the communications services to the mobile nodes, the application server messages for changing a communications session level in response to a currently available link quality of the access networks available to the mobile nodes. The mobility manager is also operable to receive access network evaluation messages from the access gateway of each of the access networks via which the mobile nodes are communicating. The access network evaluation messages provide an indication of a state of congestion of the access network with respect to a total communications bandwidth currently being used by the mobile nodes communicating via the access network in accordance with radio communications resources of a radio access interface provided by the access network which are currently being used. The mobility manager is operable to direct at least one of a change of affiliation of a first mobile node from one of a first of the access networks and a second of the access networks to the other of the first and second access networks, or a change of communications session level of the first mobile node. The change of affiliation or the change is communications session level is effected in accordance with the congestion state of the first or the second access networks, the link quality currently experienced by the first mobile node, the applications server messages and the level of service quality to which the first mobile node has subscribed with respect to a level of service quality to which a second mobile node affiliated with the first or the second access networks has subscribed.

Embodiments of the present invention provide a telecommunications system which seeks to maintain continuity and quality of service for communications sessions to a mobile node even on unregulated access networks, such as Wireless Local Area Networks (WLAN) independently of a Mobile Internet Protocol v4/v6 stack. Moreover congested access networks can be decongested by controlling the bandwidth of the users. A change of affiliation (hand-over of mobile nodes) between mobile networks is controlled in accordance with a currently experienced link quality via an access network with which the mobile node is currently attached, an amount of congestion present on the mobile network and a quality of service level to which the mobile node has subscribed. To this end, Network and Quality of Service Re-selection algorithms are executed by the mobility manager in order to control access to a mobile network to the effect that mobile nodes which have subscribed to a higher quality of service are given preference to a mobile network offering a high communications bandwidth than mobile nodes which have subscribed to a lower communications quality of service. Furthermore, the mobility manager according to some embodiments of the present invention is arranged to force a mobile node to hand over to a different mobile network where congestion on the first network has an effect of reducing a quality of service to a mobile node having subscribed to a higher quality of service.

International patent application WO 03/047296 discloses an arrangement in which messages which form part of a mobile IPV6 internet protocol are extended to provide a facility for a mobile node and a mobility manager to communicate link quality related messages. In particular, the mobile node is disclosed as sending a request for a hand over only when the link quality on its current communications mobile access network is decreasing. Thus, when it was entering the coverage of an access network with higher capacities than its current access network, the mobile node would stay on its current access network. Furthermore, when using only the mobility manager, seamless mobility is achieved but no quality of service is enabled.

For the example of the IEEE 802.11 WLAN, the spectrum is unregulated and free-for-all, in contrast to cellular systems such as GSM, GPRS or UMTS where mobile nodes are assigned resources by the network. The unfortunate consequence is that the traffic of only one mobile node can affect all the performances of all other mobile nodes. For example one of the mobile nodes receiving an UDP video streaming and being at the frontier of the WLAN hotspot coverage can consume a substantial quantity of the available communications bandwidth. As a result of the quality link degradation, the throughput of the hotspot can decrease down to zero.

Embodiments of the present invention can provide a mobility manager in which:

Control of the mobile nodes to the access networks is effected independently from a MIP v4/v6 stack as the messages defined between the different entities are written in the application layer.

Dynamically assess and selects an appropriate access network which is available for a communications sessions of a mobile node using Network and Quality of Service Reselection Algorithms (NQRA).

Guarantees or at least increases a likelihood that a minimum Quality of Service will be provided to the communications sessions even on an unregulated access networks like IEEE 802.11 WLAN.

A congested access network like an IEEE 802.11 WLAN access point can be decongested.

Distributes mobile nodes on the different access networks in accordance with an operator's policy.

Embodiments of the present invention utilize messages defined between a mobility manager and a mobile node, messages defined between a mobility manager and an access gateway, Network and Quality of Service Reselection Algorithms defined to process decisions on mobiles nodes and access points and which are performed by the mobility manager.

In some examples the mobility manager may direct the first mobile node to change affiliation to an access network providing an increase in a communications bandwidth available to the first mobile node in preference to a second mobile node, or reduce a communications bandwidth allocation to the second mobile node in favor of maintaining a communications bandwidth for the first mobile node. The preference may be made on a basis that the first mobile node has subscribed to a higher service quality level. Alternatively, the mobility manager may determine, for the case where the first and the second mobile nodes have subscribed to the same quality of service level that the communications bandwidth used by the second mobile node is utilized less efficiently than the communications bandwidth used by second mobile node. Alternatively, the first mobile node is preferred because a communications protocol used by the second mobile node may be better able to cope with a loss of internet protocol packets.

In accordance with the following description the term communications session level is intended to identify a communications service quality, which permits the use of a different media type. Typically, the higher the session level, the greater then link communications bandwidth will be available to support a media type requiring a higher communications bandwidth.

Various further aspects and features of the present invention are defined in the appended claims and include a mobility manager and a method of providing mobile internet protocol related communications services to mobile nodes via a plurality of access networks.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

Abbreviations
AG Access Gateway
ANE Access Network Evaluation
ANI Access Network Identifier
AP Access Point
API Access Point Identifier
BA Binding Acknowledge
BU Binding Update
GPRS General Packet Radio Service
GSM Global System for Mobile communications
HA Home Agent
HI Handover Instruction
IPMM IP Mobility Management
LAC Location Area Code
MAC Medium Access Control
MM Mobility Manager
MN Mobile Node NQRA Network and QoS Reselection Algorithm
PLMN Public Land Mobile Network
QoS Quality of Service
SSID Service Set IDentifier
UMTS Universal Mobile Telecommunication Services
WLAN Wireless Local Area Network Embodiments of the present invention provide an applications layer mobility manager within a mobility manager server which performs mobility management in a manner which is independent of a particular internet protocol version. The mobility manager messages are written into the application layer instead of linking these to a mobile internet protocol standard. Thus in practice these messages may be for example a mark-up language based messages such as XML over TCP/IP or UDP/IP.

Figure 1:
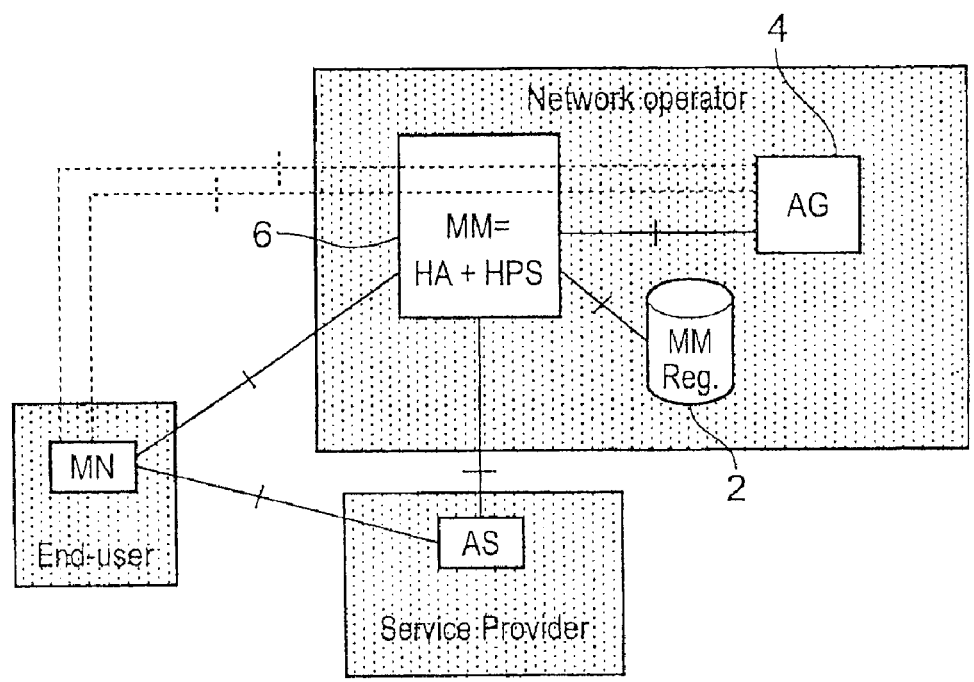
FIG. 1 is a schematic block diagram of a functional internet protocol multi-media architecture according to an embodiment of the present invention.

A general system architecture for elements forming an embodiment of the present invention are illustrated in FIG. 1. In FIG. 1 an applications server AS is arranged to execute an applications layer program for providing for example a multimedia communication service to a mobile node MN. Although the applications server AS is providing the multimedia communications session, a communications link via which the service is provided utilizes an internet protocol which is supported over a communications channel which may be affected via a number of mobile communications access networks. As will be explained shortly a communications bandwidth may vary in dependence upon the type of access network via which the mobile node is communicating. This is because a communications bandwidth which can be provided by the access network will be different between different access networks depending on a radio communications interface provided by the access network. A mobility manager MM is provided in order to control the communications session and more particularly the hand over of the mobile node from one access network to another. This is effected by executing a Network and Quality of Service Reselection algorithm in dependence upon user profile information. The user profile information is provided by an mobility manager register 2 and may include an indication of a service quality level to which a user of the mobile node has subscribed. In order to control an affiliation of mobile nodes between a number of access networks, in dependence upon a current loading on the access network, the mobility manager receives access network evaluation messages (ANEag) from an access gateway 4 of a access network. The access gateway 4 is one example of a point in a access network through which all inbound and outbound internet protocol packets are communicated.

In FIG. 1, the mobility manager server 6 effectively forms a home agent in respect of internet protocol communications with an mobility manager specific messages. The mobility manager also includes a hand over policy server (HPS) which manages the IPMM specific messages and decides whether hand over and/or a change in a communications service level should be effected or not. As mentioned above, the IPMM register 2 provides a database in which user context information (user profile, radio environment, session parameters) is stored together with information on the state of the different access networks. The access gateway AG 4 activates resources for a given access network and deals with access resource monitoring. For example, for a WLAN an access gateway is provided to monitor resources and fetch information from all access points within the WLAN to evaluate a load on the available communications resources within the network.

As mentioned above, the Application Server (AS) manages one or several applications for providing communications services to one or several participants using internet protocol communications with the mobile nodes.

Figure 2:
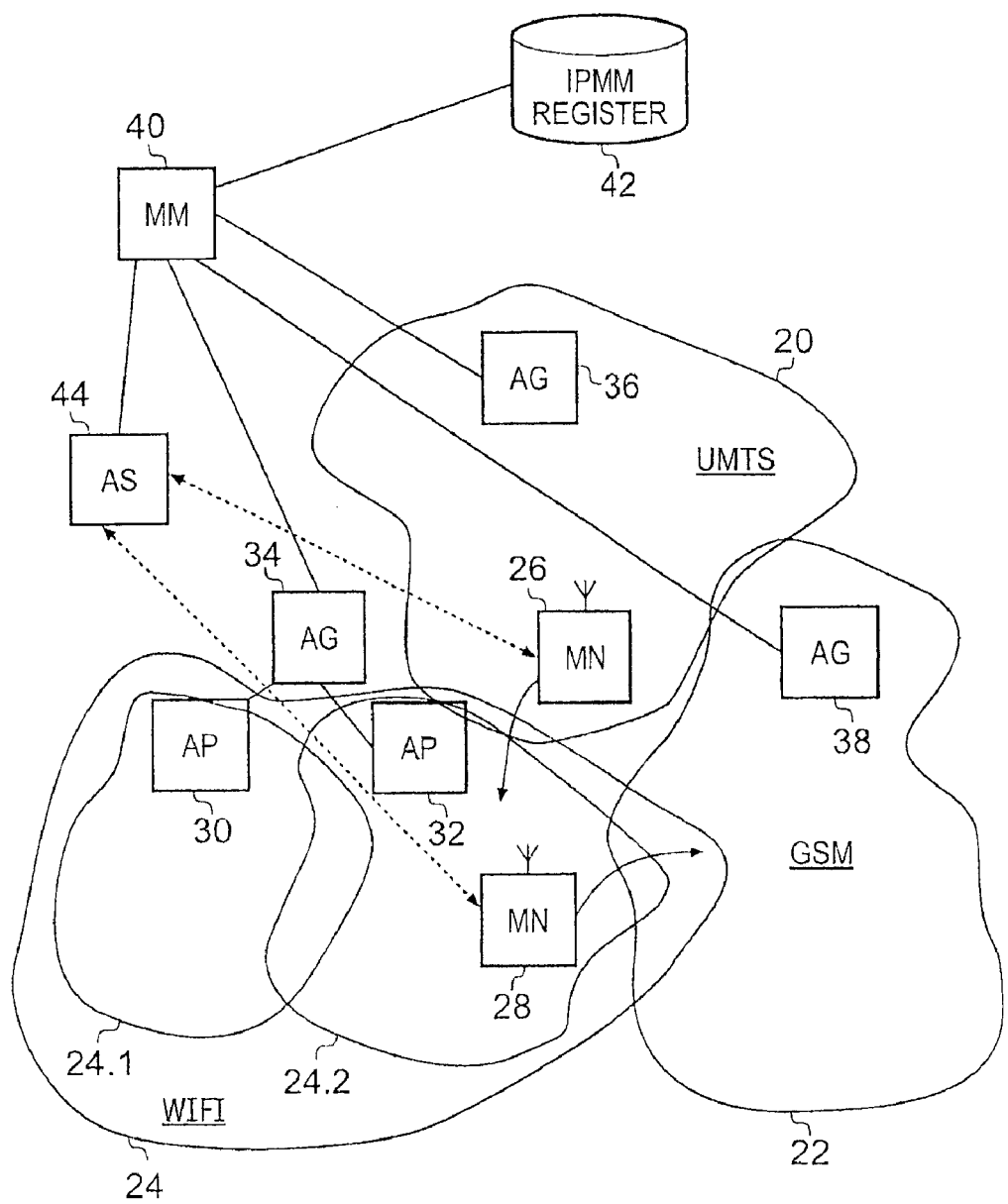
FIG. 2 is a schematic block diagram of a telecommunications system in which the internet protocol multi-media system of FIG. 1 is used to provide communications services to mobile nodes using a plurality of access networks.

A better appreciation of the operation of the system shown in FIG. 1 can be understood from FIG. 2 which represents an example embodiment of the present invention. In FIG. 2 three access networks 20, 22, 24 are shown to provide mobile communications to mobile nodes 26, 28. From the example shown in FIG. 2 the first access network 20 operates in accordance with the UMTS standard, the second access network 22 operates in accordance with the GSM standard and the third access network 24 operates in accordance with a WLAN standard. The third access network 24 may operate in accordance with the IEEE 802.11B standard which is commercially referred to as WIFI. In FIG. 2 the third access network 24 is comprised of two sub-networks providing localized concentration or hotspots within which mobile communications via the WLAN standard are possible. Each of the sub-networks 24.1, 24.2 includes an access point 30, 32 via which internet protocol packets are sent and received to mobile nodes operating within a coverage area provided by the sub-network 24.2, 24.2. Thus for the third access network an access gateway 34 is provided to receive internet protocol messages from the access points 30, 32. The first and second access networks also include an access gateway 36, 38 which serve to communicate access network evaluation messages (ANEag) to a mobility manager server 40 where they are received by an applications layer mobility manager. In accordance with the elements shown in FIG. 1 the mobility manager server also includes a mobility manager register 42 in which user context information is stored and an applications server 44 which executes an application layer program for providing communications services to the mobile nodes 26, 28.

As indicated above, embodiments of the present invention provide a facility for controlling access of mobile nodes to various access networks in accordance with a subscribed quality of service level. For example the users of the mobile nodes may have subscribed to one of three quality of service levels which will be referred to in the following description as bronze, silver and gold. The mobility manager within the server 40 controls access by the mobile nodes to the access networks in dependence upon the subscribed quality of service in combination with a link quality available from the mobile nodes via the access networks and a congestion of the access networks.

For the example of a WLAN access network unlike a cellular mobile communications networks like GSM and UMTS, communication is unregulated and free for all. As a result any mobile node may acquire a greater proportion of the available communications bandwidth than another mobile node. For example one of the mobile nodes could be receiving a UDP video stream and as a result may consume a substantial proportion of the bandwidth available on the WLAN. As a result the quality of the communications link for other mobile nodes within the WLAN can decrease to zero. As will be explained, shortly embodiments of the present invention provide a mobility manager which is able to manage access of the mobile nodes to the access networks using Network and Quality of Service Re-selection algorithms. As a result a first mobile node 26 may be directed to hand-over to the third access network 24, in preference to a second mobile node which may be directed to hand-over from the third access network to the first access network 20. The preference may be as a result of a higher priority, for example because the first mobile node has subscribed to a higher quality of service level.

Figure 3:
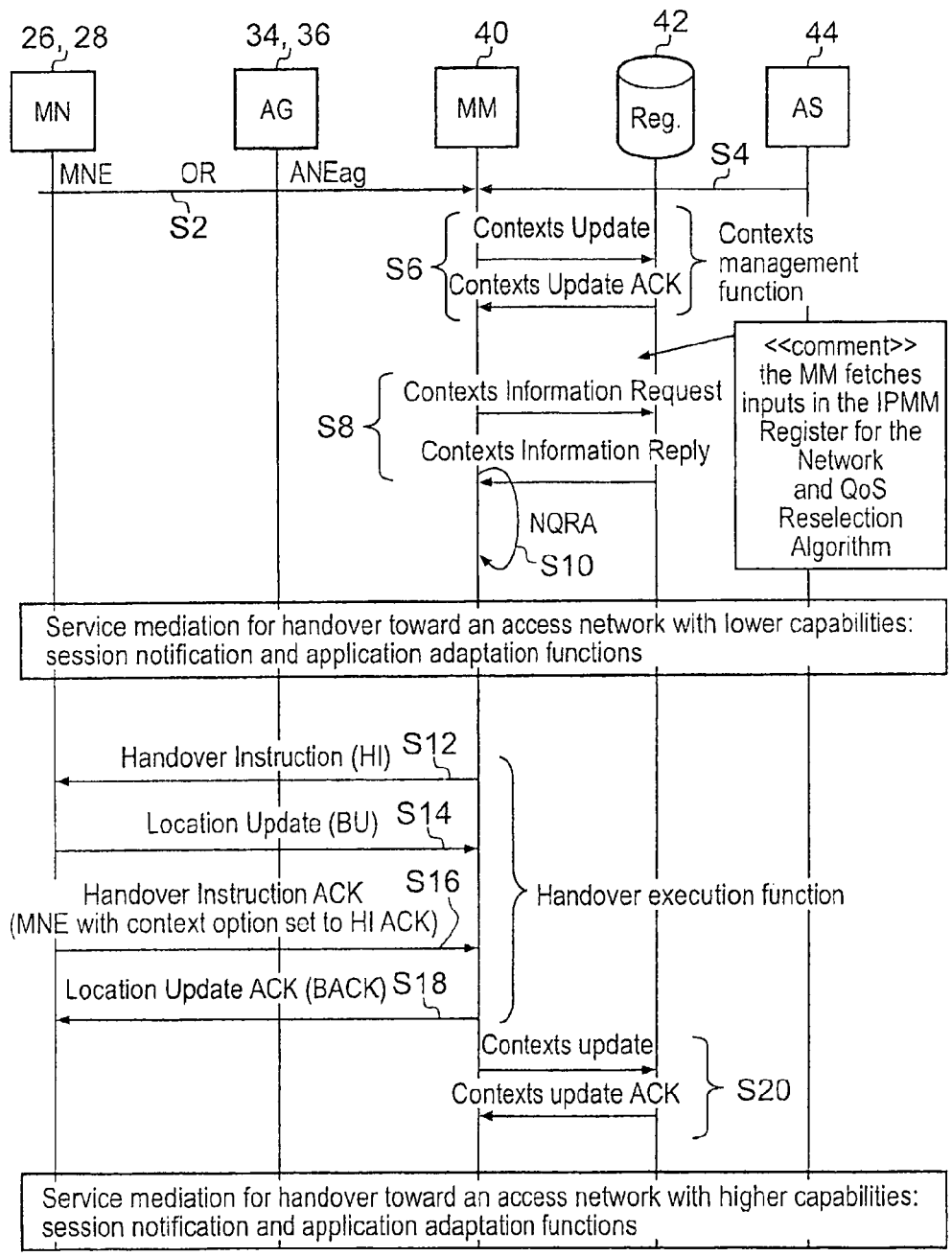
FIG. 3 is a schematic representation of a message flow and process steps performed by the mobility manager shown in FIG. 2 to control access by the mobile nodes to the access networks.

An example operation of one embodiment is provided by a flow diagram illustrated in FIG. 3.

In FIG. 3 at a first step S2 the mobile node may communicate link quality evaluation messages MNE to the mobility manager 40. An access gateway may also communicate access network evaluation messages ANEag to the mobility manager reporting on a state of communications bandwidth consumed.

The application server executes an application layer program providing a communications service to a mobile node. The applications server may send application server messages to the mobility manager for example requesting that a currently experienced bandwidth of the mobile node be increased so that for example a video message may be delivered.

In a message exchange S6 the mobility manager updates the user contexts associated with the mobile node concerned with the currently received access network evaluation messages, the link quality evaluation messages or application server messages received in steps S2 and S4.

S8: The mobility manager then interrogates the mobility manager register 42 for user context information for use in the Network and Quality of Service Re-selection algorithm. The user context information includes such things as a quality of service level to which the user of the mobile node has subscribed.

S10: As will be explained shortly the Network and Quality of Service Re-selection algorithm is then executed to determine whether or not a mobile node should hand over to another mobile access network having a lower relative communications resources such as from a WLAN network to a cellular mobile network, and/or whether an adaptation to the current communications session level is required. Accordingly, this requires session notification and application adaptation functions. In contrast, process steps which are executed in order for a mobile node to hand over toward an access network with higher relative communication parameters is illustrated in the bottom half of FIG. 3. The steps are summarized as follows:-

S12: The mobility manager determines that the mobile node can access a access network providing higher communications bandwidth such as for example handing over to a wireless LAN. Accordingly, the mobility manager issues a hand over instruction HI.

S14: If the hand over is successful then the mobile node informs the mobility manager of its new location by sending a location update message (Mobile IP Binding Update message).

S16: The mobile node then sends a hand over instruction acknowledgement and includes an access network evaluation message with a context option set to high (HI ACK MNE).

S18: The mobility manager then acknowledges the location update message.

S20: The mobility manager then updates the contexts for the user by communicating information to the IPMM register 42 which is then acknowledged. Two examples of Network and Quality of Service Re-selection algorithms will now be described. However, the general process for evaluating whether or not a mobile node should be instructed to hand over and/or adapt its current session level to or from a first mobile access network from or to a second mobile access network will now be described. In one example the first mobile access network with a relatively high communications bandwidth may be a WLAN and the second mobile access network having relatively lower communications bandwidth may be a cellular mobile radio network. A general operation of the mobility manager is represented by the flow diagram shown in FIG. 4 which is summarized as follows:

S30: The mobility manager receives link quality evaluation messages (MNE) from a mobile node evaluating the current quality of communications experienced via the access network to which the mobile node is currently attached. The mobility manager may also receives application server messages from the applications server requesting an increase or a decrease in communications bandwidth provided via the access network to which the mobile node is currently affiliated.

S32: The mobility manager also receives access network evaluation messages (ANEag) from the access gateways of each of the access networks reporting on a current congestion state with respect to the communications resources used.

S34: The mobility manager obtains context information from the mobility manager register. The user context information includes a user profile, an indication of the service quality with which the user has subscribed (bronze, silver, gold) and any other information relating to the management of the mobile node such as previous evaluation messages and communication of the current access network with which the mobile node is affiliated.

S36: At least one Network and Quality of Service Re-selection algorithm is run for the link quality evaluation messages (MNE), the applications server messages, and the access network evaluation messages (ANEag) to determine whether or not each mobile node should be directed to hand-over from one mobile access network to another mobile access network based on the current congestion state of the mobile access network with which the mobile node is affiliated, a requirement for a subscribed communications session service level and the currently available link quality.

S38: From a result of the Network and Quality of Service Reselection algorithm, the mobility manager decides whether the mobile node should hand over to another mobile access network. If a hand over is required the processing proceeds via step S44, otherwise processing proceeds to step S40.

S40: If a hand-over is not required, then the mobility manager determines nevertheless whether the mobile node should adapt its current communications session level in accordance with for example a requirement to decongest a mobile access network with which the mobile node is currently affiliated. If no adaptation to the communications session level is required, then processing proceeds to step S49. If adaptation to the communications session level is required then processing proceeds to step S42.

Figure 4:
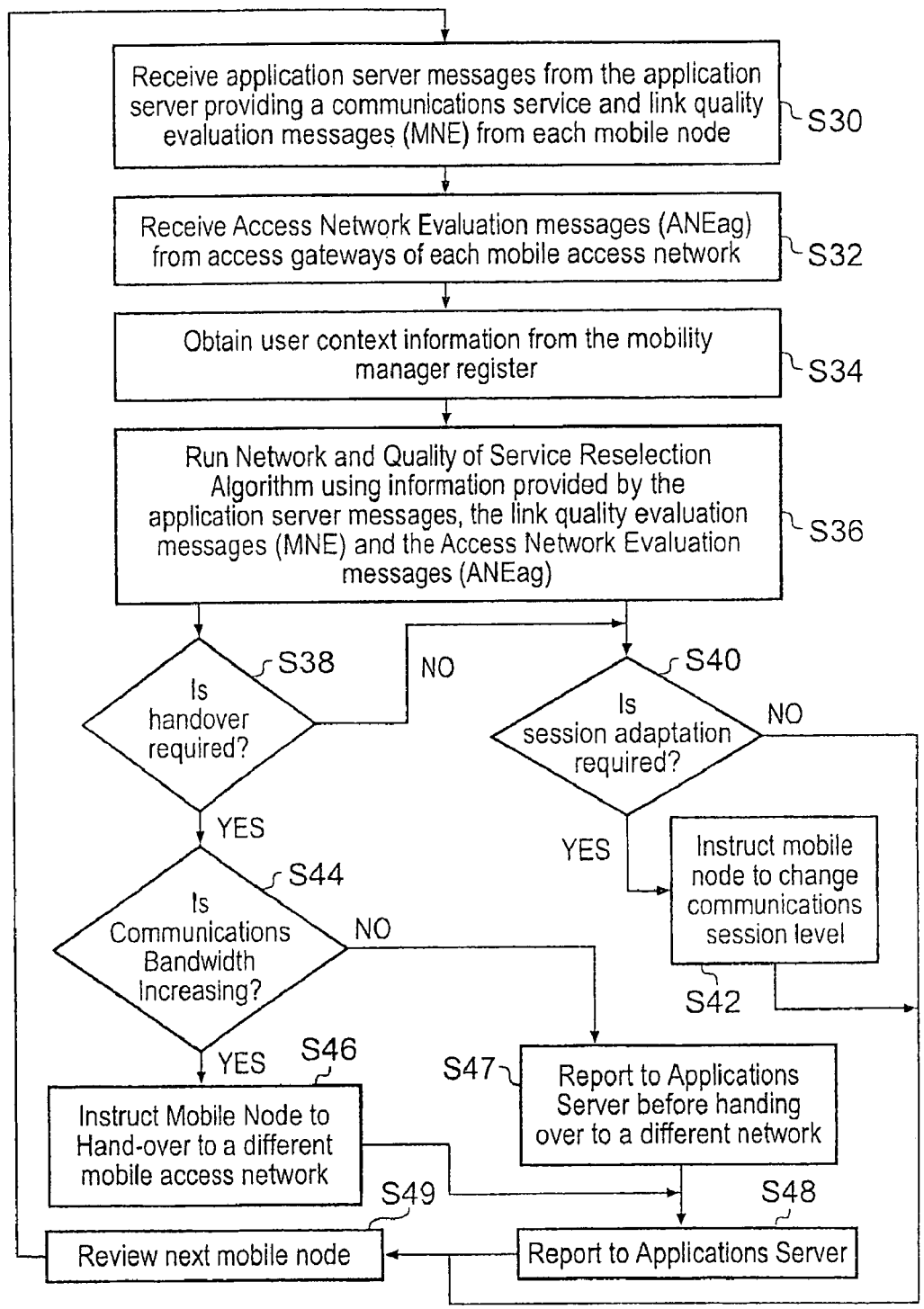
FIG. 4 is a flow diagram illustrating a process controlling a change of affiliation of the mobile nodes between mobile access networks and/or a change in communications session level performed by the mobility manager.

S42: The mobility manager operates in combination with the applications server to instruct the mobile node to adapt its communications session level in order to accommodate a reduction or an increase in a communications bandwidth which it is allocated from the mobile access network with which it is currently affiliated. As shown in FIG. 4, this is done by the mobility manager reporting to the applications server that the mobile node should decrease its communications bandwidth consumption. The applications server may then instruct the mobile node to reduce its communications session level to effect the reduction in the communications bandwidth which it consumes.

S44: If the mobile node is to hand over to a different mobile access network, then the mobility manager determines whether a link communications bandwidth available to the mobile node is to increase or decrease. If the link communications bandwidth is to increase then processing proceeds to step S46, otherwise processing proceeds to step S47.

S46: If the mobile node is to hand over to a different network then the mobility manager communicates a Hand Over instruction (HI) to instruct the mobile node to hand over to the different access network, and then reports to the applications server in step S48.

S47: If the link communications bandwidth is to decrease, or remain the same, then the mobility manager reports the change of affiliation to the applications server before the change of affiliation is made. As such according to the technique disclosed in EP 1 435 748, the applications server can adapt the communications session level before the hand over is executed. Alternatively, if the link communications bandwidth remains the same then the hand over may be executed and the applications server informed afterwards.

S48: The applications server receives a report from the mobility manager of an decision with respect to a change of affiliation from one mobile access network to another.

S49: If no hand over or adaptation of the communications session level is required then the next mobile node is reviewed as to whether or not a hand over is required.

The flow diagram in FIG. 4 indicates that the mobility manager performed at steps S36 at least one algorithm to determine whether hand over or a session adaptation should be ordered for a mobile node. These Network and Quality of Service Re-selection algorithms may of course form part of the same algorithm. However, for illustrating the example embodiments of the present invention it is instructive to separate the algorithms. Examples of these algorithms will now be described.

Network and Quality of Service Re-selection Algorithm 1

Figure 5A:
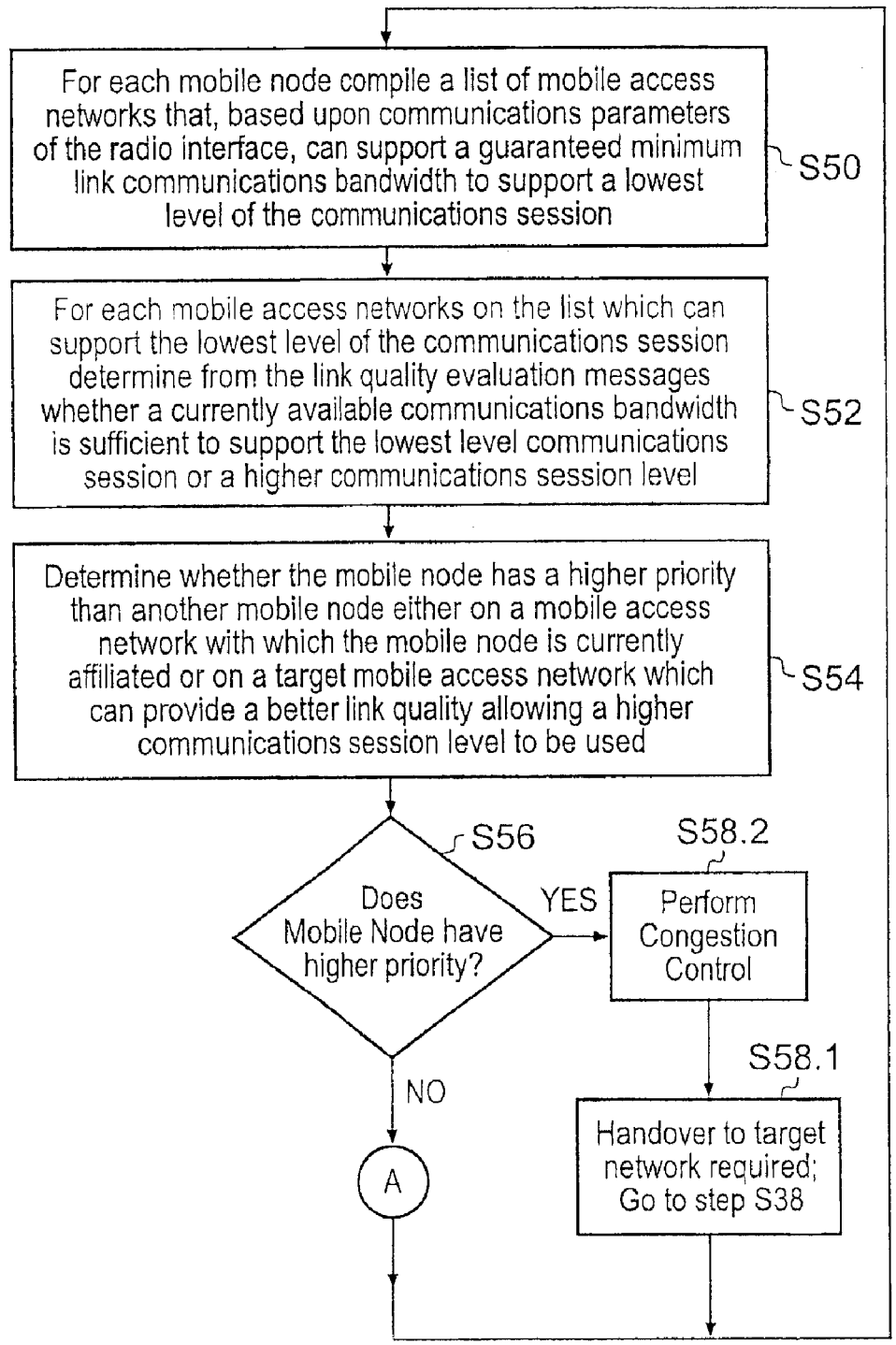
FIGS. 5A and 5B is a flow diagram illustrating an example of a Network and Quality of Service Re-selection Algorithm performed in the process illustrated in FIG. 4.
Figure 5B:
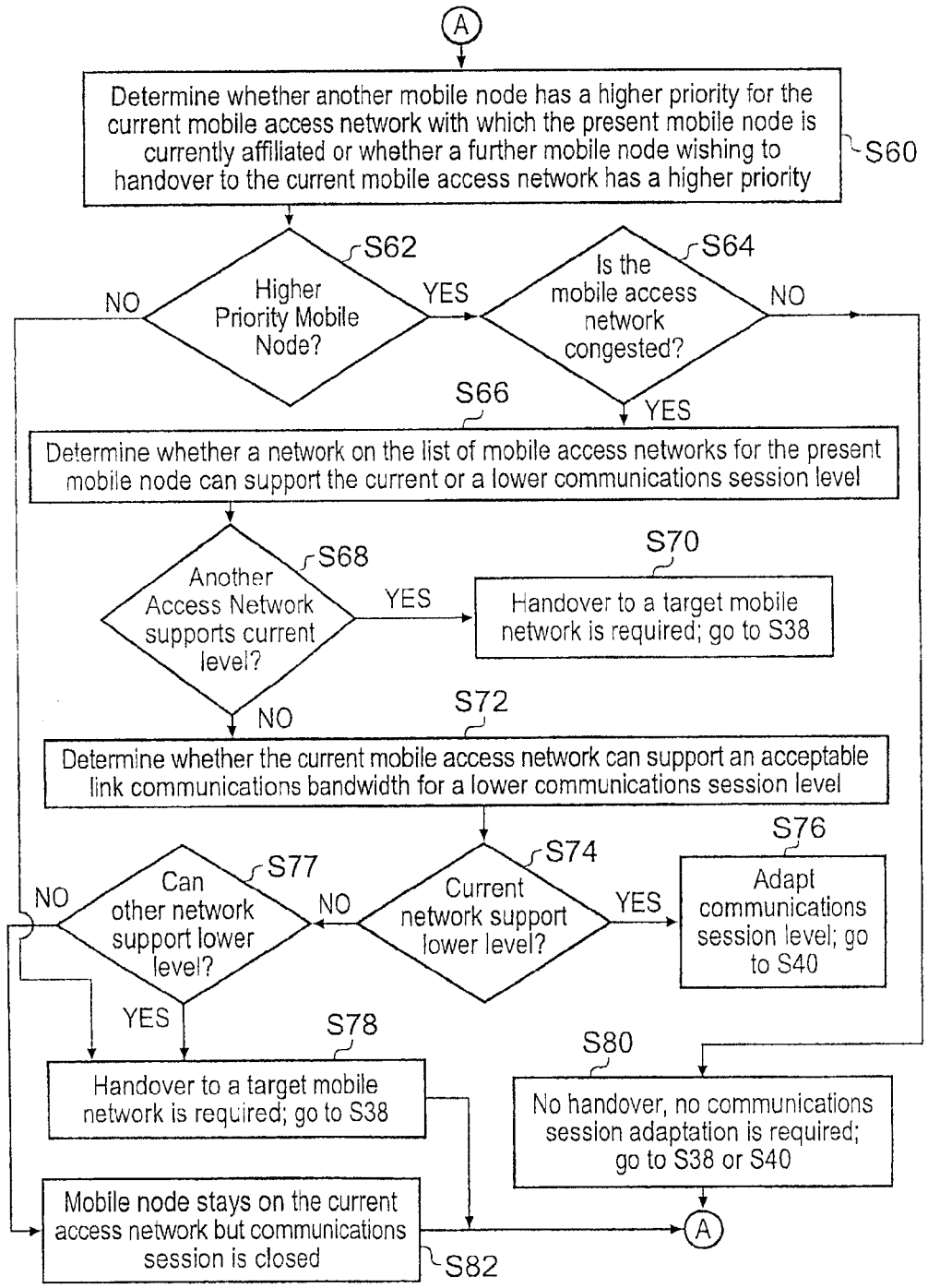

FIGS. 5A and 5B provide a flow diagram illustrating the operation of the mobility manager for example in step S36 of the flow diagram in FIG. 4. The steps according to the first Network and Quality of Service Re-selection algorithm shown in FIG. 5A and FIG. 5B are summarized as follows:

S50: For each mobile node it is determined which access network can support a guaranteed minimum link communications bandwidth required to support a lowest communications session level. Each mobile access network is then added to a list of possible access networks for that mobile node.

S52: For each mobile access network on the list of mobile access networks which can support the minimum communications bandwidth of the lowest communications session the mobility manager evaluates the link quality which is currently available. To this end, the mobility manager collates information provided by the link quality evaluation reports on the actual or potential link communications bandwidth that each mobile node has from the access network with which it is currently affiliated or could have from one or more other access networks. The mobility manager determines whether the currently available communications bandwidth is sufficient to support the lowest level communications session, or whether a higher communications session level can be supported.

S54: The mobility manager determines for each mobile node whether that mobile node has a higher priority than other mobile nodes either on the current access network or on a target access network which that mobile node may prefer because the target access network offers a higher link communications bandwidth. The higher bandwidth may allow the mobile node to experience an improved quality of communication session level such as for example video instead of audio via that access network.

S56: Does a currently evaluated mobile node have a higher priority than at least one other mobile node either on the current access network or on the target access network?

S58: S58.1 If the mobile node does have a high priority then the mobility manager orders the mobile node to hand over to the target access network, and/or change communications session level in accordance with an increase in communications link bandwidth. However, in order to determine whether the mobility manager can allow the mobile node to hand over to a target network, the mobility manager may perform a congestion management operation at step S58.2 in accordance with the operation represented by the flow diagram in FIG. 6, which will be described shortly.

S60: If the mobile node does not have a higher priority than other mobile nodes, then the mobility manager then determines whether another mobile node has a higher priority for the current mobile access network with which the mobile node is currently affiliated or another mobile node affiliated with another mobile network wishing to hand-over to the current mobile access network has a higher priority than the mobile node.

S62: Is there a higher priority mobile node? If yes then processing proceeds with step S64, otherwise processing proceeds with step S78

S64: If there is a higher priority mobile node then the mobility manager determines whether or not the current mobile access network is congested. Is the current mobile access network congested? If the access network is congested then processing proceeds with step S66, otherwise processing proceeds with step S80.

S66: If the current mobile access network is currently congested then the mobility manager determines whether there is another mobile access network which can support the current or a lower communications session level.

S68: Can another access network provide a communications link bandwidth to support the current or a lower communications session level? If there is another mobile access network which can support the current communications link bandwidth, then processing proceeds with step S70, otherwise processing proceeds with step S72.

S70: The mobility manager determines that the mobile node should hand over to the other mobile access network which can provide a communications link bandwidth to support the current communications session level and processing proceeds to step S38 in FIG. 4.

S72: The mobility manager determines whether the current mobile access network can support an acceptable link communications bandwidth for a lower communications session level.

S74: Can the current mobile access network support a lower communications session level? If the current mobile access network can support a lower communications session level, the processing proceeds to step S76, otherwise processing proceeds to step S77.

S76: The mobility manager determines that the communications session level should be adapted to the lower level which can be supported by the current mobile access network and processing proceeds to step S40 in FIG. 4.

S77: If the current access network cannot support the lower communications session level, then with regard to what was determined in step S66, the mobility manager decides to direct a hand over to the other network if that network can support the lower communications session level and processing proceeds to step S78. If no other network can support the lower communications session level then processing proceeds to step S82.

S78: This is the same as step S70, the mobility manager determines that the mobile node should hand over to the other mobile access network which can provide a communications link bandwidth to support the current communications session level and processing proceeds to step S38 in FIG. 4.

S80: The mobility manager concludes that no hand over is required and no adaptation of the communications session level is required and processing proceeds to either step S38 or S40.

S82: The mobile node stays on the current access network but the communications session is closed for the mobile node.

There are various parameters, which can be used to prioritize one mobile node over another. For example as well as the subscribed quality of service for example bronze, silver and gold, the mobility manager may discriminate on the basis of:
- A load which the mobile node is placing on the access network
- Whether the mobile node has exceeded an expectation in terms of an agreed consumption of communications bandwidth
- Whether the mobile node has indicated that a particular access network is preferred In order to ensure stability of the access network.

Network and Quality of Service Re-selection Algorithm 2

Figure 6:
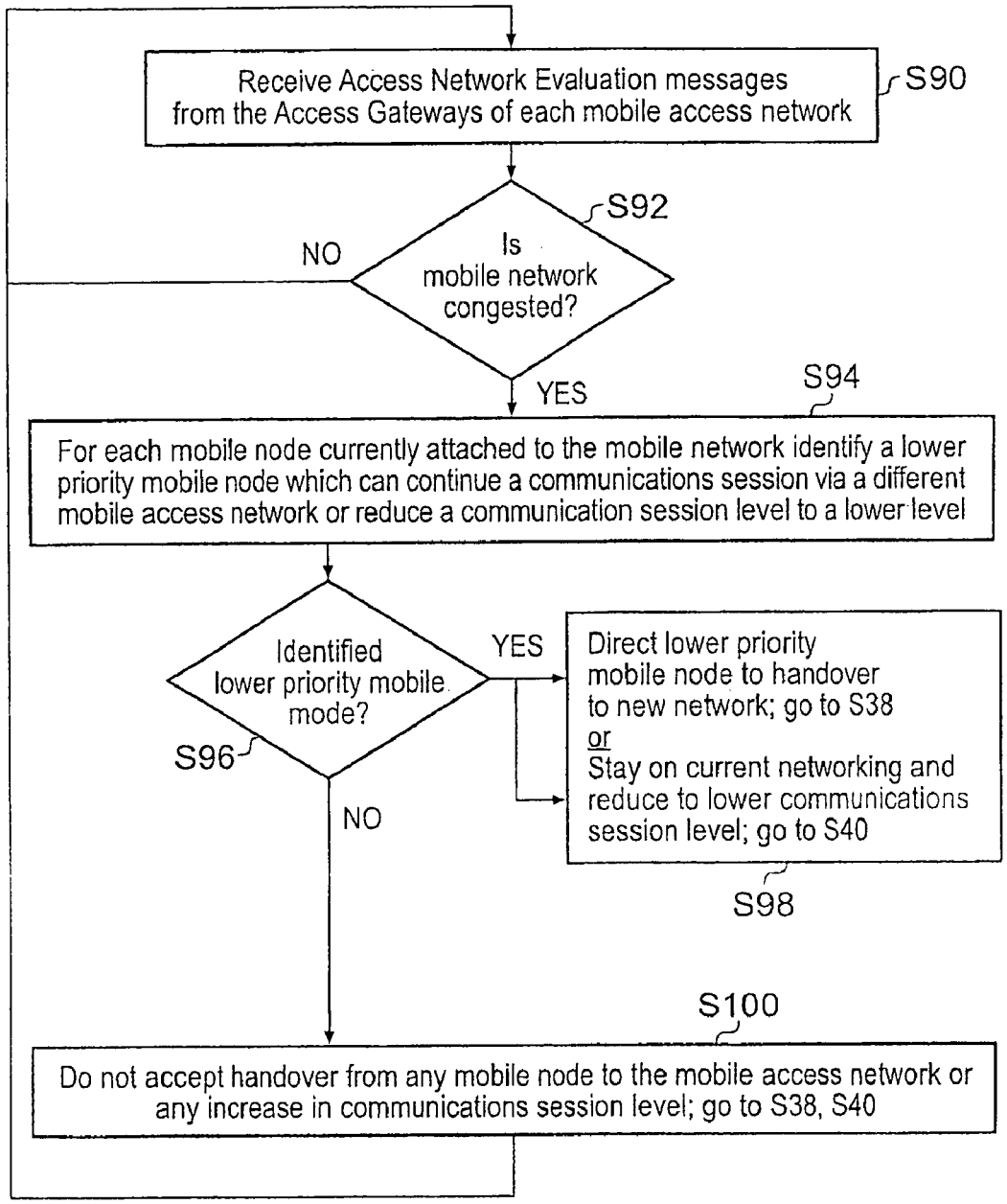
FIG. 6 is a flow diagram illustrating a second example of a Network and Quality of Service Re-selection Algorithm providing congestion control performed in the process illustrated in FIG. 4 and FIG. 5A.

As indicated above a second algorithm for determining whether the mobile node should hand over to another access network according to a congestion of that access network according to step S38 in FIG. 4 evaluates the congestion of access networks in order to determine whether hand over and/or session adaptation for the mobile node is required. An example embodiment in which mobile nodes are directed to hand over in dependence upon a current congestion of access networks is illustrated in FIG. 6. FIG. 6 provides a flow diagram to illustrate the operation of the mobility manager. FIG. 6 is summarized as follows:

S90: The mobility manager receives access network evaluation messages from the access gateways of each of the access networks.

S92: From the access network evaluation messages the mobility manager determines whether a particular access network is congested. If not then processing proceeds to step S90 and the next access network evaluation messages are received and evaluated. If the mobile access network is congested then processing proceeds to step S94.

S94: If a mobile access network is indicated as being congested then the mobility manager determines for each mobile node currently affiliated with the access network whether one of those mobile nodes has a lower priority than the others and can continue a communications session via a different access network. The mobility manager therefore identifies whether a lower priority mobile is currently attached to the congested access network. Priority of one mobile node over another can be determined from any of the following factors:
- Whether the mobile node can operate via another of the access networks for example whether the mobile node is GPRS capable
- A subscription level to which the mobile node has subscribed for example bronze, silver and gold
- A current bandwidth which the mobile node has consumed with respect to other mobile nodes so that a high consuming mobile node may be given a lower priority than those mobile nodes consuming a lower amount of the communications bandwidth
- A length of the media access control frames generated by the mobile node
- A transport protocol being used such as for example where UDP is preferred as a transport protocol to TCP which can adapt to packet loss.

S96: Is a lower priority mobile node affiliated with the congested access network? If there is a lower priority mobile node then the mobility manager proceeds to step S98, otherwise processing continues from step S100.

S98: The mobility manager performs steps S66 to S80, to determine whether to either hand over to another mobile access network and proceed from step S38 or to stay on the current network and proceed to step S40 in FIG. 4.

S100: The mobility manager concludes that no hand over will be accepted to the congested mobile access network and that no increase in communication link bandwidth will be provided to the mobile nodes affiliated with the congested access network, so that no increase in communications session levels can be allowed.

In order to implement the mobility manager described above, the format and grammar of messages for communication to and from the mobility manager will now be described. In order to implement a mobility manager which is independent of the IP version, the mobility manager messages presented below have been written in the application layer instead of linking them to a Mobile IP standard which would haste to take into consideration at least two internet protocol standards which are Mobile IPv4 and Mobile IPv6. Practically, these messages could be XML messages over TCP/IP or UDP/IP.

There are three main messages:
- MNE: the mobile node is the component that allows a user to access to its applications wherever he is located. It forms a message containing information on its available access networks quality (MNE) that it sends to the Mobility Manager.
- ANEag: the Access Point is the node to which a mobile node is attached to. The Access Gateway collects information from Access Points on their current load, i.e. the ratio of the radio resource used, variation and number of connected MN. An Access Gateway is a node that centralizes information of several Access Points, forms a message (ANEag) that it sends to the Mobility Manager.
- HI handover instruction message which is sent from the Mobility Manager to the mobile nodes.

A.1-MNE

First, we present the format of the message MNE. The message is divided into two parts, a common part and a measurement part that contains one or several measurements.

The common part contains the following information:
- message type (1 byte): 02 identifies evaluation messages.
- sequence number (1 byte): this value is updated each time an MNE is sent by an equipment (mobile node or access gateway).
- lifetime (1 byte): this value gives the validity time of the message
- sender message type (1 byte): identifies the type of equipment that sends the message (01=access gateway; 02=mobile node).
- sender identifier (6 bytes): this value uniquely identifies the equipment that sends the message. It can be a MAC address
- context_option (1 byte): this value indicates if the message is an user contexts activation MNE, an HI ACK MNE, an immediate HO MNE, or a normal MNE.
- number of measurements (1 byte): this value gives the number of measurements reported in the message.

Here is the grammar of the measurement part:
- access network type (1 byte): Identifies the type of access network (01=cellular; 02=802.11 . . . ).
- ani_length (1 byte): this value gives the length of the ANI in bytes.
- access Network Identifier (1-32 bytes): this value uniquely identifies the access network. It is the PLMN for GPRS and SSID for WLAN.

access Point Identifier (0-6 bytes): this value uniquely identifies an access point in an access network and is its MAC address.

quality (1 byte): this value gives the current quality on the link.

current (1 byte): This value indicates if the access network is the current access network.

gprs_slot_up (4 bits): this value is only present for cellular network and gives the capability of the mobile node in the uplink.

gprs_slot_down (4 bits): this value is only present for cellular network and gives the capability of the mobile node in the downlink.

A.2-ANEag

Then, we present the format of the ANEag message. This message is divided into two parts, a common part with MNE messages and a specific measurement part that contains one measurement for one access point.

The common part contains the following information:

message type (1 byte): 02 identifies evaluation messages sequence number (1 byte): this value is updated each time an ANEag is sent by the access gateway and may allow MM to ignore obsolete ANEag messages lifetime (1 byte): this value gives the validity time of the message sender message type (1 byte): identifies the type of equipment that sends the message (01=access gateway; 02=mobile node).

sender identifier (6 bytes): this value uniquely identifies the Access Gateway that sends the message; it is a MAC address or an other identification.

The measurement part contains the following information:

access network type (1 bytes): Identifies the type of access network (01=cellular; 02=802.11 . . . )

Access Point Identifier (0-6 bytes ): this value uniquely identifies an access point in an access network, it is a MAC@.

connected_MN (2 bytes): this value gives the number of mobile nodes associated to the access point load: this field is divided into several sub-fields:
  Value: Load value processed by the AG for this AP
  Variation: evolution of this value
  Optionally, the ANEag message may also contain the following fields:
  Packet lost: the number of packet lost by the access point (contains received and sent packets) for one second.
  The mobile node: contains information about all the mobile nodes connected to the AP
    MAC address of the MN: identifies die mobile node which is connected to the access point (WLAN MAC@)
    Statistics: give further information to the MM:
      The mean received packet length for this MN
      The mean sent packet length for this MN
      The bytes number sent by this MN for one second
      The bytes number received by this MN for one second

| | Parameter | Value | comment |
|---|---|---|---|
| load evaluation message (ANEag) | Load provided per AP | −1 | AP is off, i.e. unavailable for communication |
| | | 0 | 50% or less of the radio resources is used |
| | | 1 | between 50% and 80% radio resource is used |
| | | 2 | more than 80% of the radio resources is used |
| | | 3 | AP is congested (packet loss) |
| | Variation provided per AP | 0 | utilisation decreasing or being stable |
| | | 1 | utilisation growing up |

Note:
More fields could be added in the MNE or in the ANEag if necessary. These fields could be:
Modulation used by the Mobile Node to communicate with the AP
Packet loss, delay and jitter uplink/downlink for a Mobile Node 1.3-HI Below is the format of the HI message:

message type (1 byte): 01 identifies handover instruction messages.

sequence number (1 byte): this value is updated each time a handover instruction is sent to the same mobile node.

access network type (1 byte): Identify the type of access network (01=cellular; 02=802.11 . . . ).

ani_length (1 byte): this value gives the length of the Access Network Identifier in bytes.

access Network Identifier (1-32 bytes): this value uniquely identifies the access network.

access Point Identifier (0-6 bytes): this value uniquely identifies an access point in an access network.

Various modifications may be made to the embodiments described above without departing from the scope of the present invention. For example, although the embodiments have been described with respect to a WLAN in accordance with the IEEE 802.11 standard, it will be appreciated that other WLAN standards are appropriate as well as cellular mobile radio networks other than GSM and UMTS.

Various further aspects and features of the present invention can be seen in the following particular embodiments:

A telecommunications system wherein the mobility manager is operable to determine that the first mobile node should change affiliation from the first access network to the second access network or to reduce a communications bandwidth consumed on the first access network, if the access network evaluation messages indicate that the state of congestion is such that there is insufficient communications bandwidth available from the first access network to support the subscribed quality of service for the communications session, and at least one of the communications bandwidth used by the first mobile node is utilized less efficiently than the communications bandwidth used by other mobile nodes which have subscribed to the same quality of service level, or a communications protocol used by the first mobile node is better able to cope with a loss of internet protocol packets.

A telecommunications system, wherein the mobility manager is operable to direct the first mobile node to change affiliation to the first access network from the second access network, the second access network providing a lower relative communications link bandwidth with respect to the first access network, if the access network evaluation messages received from the access gateway of the first network indicate that there are sufficient communications resources available from the first access network due to the congestion state, the first mobile node includes a communications interface for communicating via the first access network, and the applications server messages indicate that the mobile node would benefit from a higher relative communications link bandwidth.

A telecommunications system, wherein the mobility manager is responsive to link quality evaluation messages (MNE) from the first mobile node to determine in combination with the access network evaluation messages that a current communications session level can only be supported by a change of affiliation to the first access network, the change of affiliation being effected in preference to the second mobile node.

A telecommunications system, wherein the mobility manager is operable to determine that the first mobile node should be directed to change affiliation to the first mobile network in preference to the second mobile node which has subscribed to the same quality of service level, if a communications session level provided to the first mobile node can be accommodated within a communications bandwidth available from the first access network rather than a bandwidth required to accommodate a communications session level provided to the second mobile node.

A telecommunications system, wherein the first mobile node and the second mobile node are currently affiliated with the second access network and the first mobile node is directed to change affiliation to the first access network and the second mobile node is not.

A telecommunications system, wherein the first mobile node is affiliated with the second access network and the second mobile node is currently affiliated with the first access network, the mobility manager being operable to direct the second mobile node to change affiliation to the second access network and the first mobile node to change affiliation to the first access network.

A telecommunications system, wherein the first mobile node is affiliated with the second access network and the second mobile node is currently affiliated with the first access network, the mobility manager being operable to direct the second mobile node to change a communications service level to accommodate a communications bandwidth required by the first mobile and the first mobile node is directed to change affiliation to the first access network.

A telecommunications system, wherein, the first access network is a WLAN and the second access network is a cellular mobile radio network.

A mobility manager, wherein the mobility manager is operable
to determine that the first mobile node should be directed to change affiliation to the first access network from the second access network, in preference to the second mobile node, the second access network providing a lower relative communications bandwidth with respect to the first access network, if the access network evaluation messages (ANEag) indicate that a communications bandwidth is available from the first access network for supporting a communications session level to the first mobile node, and the first mobile node includes a communications interface for communicating via the first access network, and the first mobile node has subscribed to a higher quality of level than the second mobile node.

A mobility manager, wherein the mobility manager is operable to determine that the first mobile node should change affiliation from the first access network to the second access network or to reduce a communications bandwidth consumed on the first access network by changing a communications session to a different level using a lower communications bandwidth, if the second mobile node has subscribed to a higher level of service quality than the first mobile node and the communications bandwidth from the first access network used by the first mobile node has an effect of making an available communications bandwidth insufficient for the second mobile node.

A mobility manager, wherein the mobility manager is responsive to link quality evaluation messages (MNE) from the first mobile node to determine in combination with the access network evaluation messages that a current communications session level can only be supported by a change of affiliation to the first access network, the change of affiliation being effected in preference to the second mobile node.

A mobility manager, wherein the mobility manager is operable
to determine that the first mobile node should be directed to change affiliation to the first mobile network in preference to the second mobile node which has subscribed to the same quality of service level, if a communications session level provided to the first mobile node can be accommodated within a communications bandwidth available from the first access network rather than a bandwidth required to accommodate a communications session level provided to the second mobile node.

A mobility manager, wherein the first mobile node and the second mobile node are currently affiliated with the second access network and the first mobile node is directed to change affiliation to the first access network and the second mobile node is not.

A mobility manager, wherein the first mobile node is affiliated with the second access network and the second mobile node is currently affiliated with the first access network, the mobility manager being operable to direct the second mobile node to change affiliation to the second access network and the first mobile node to change affiliation to the first access network.

A mobility manager, wherein the first mobile node is affiliated with the second access network and the second mobile node is currently affiliated with the first access network, the mobility manager being operable to direct the second mobile node to change a communications service level to accommodate a communications bandwidth required by the first mobile and the first mobile node is directed to change affiliation to the first access network.

The invention claimed is:

1. A telecommunications system for providing communications services to one or more mobile nodes via a plurality of access networks, each of the mobile nodes subscribing to a level of service quality and is affiliated with one of the access networks, the communications services are related to mobile Internet protocol and are provided within Internet protocol communications sessions having a plurality of communications session levels, each of the session levels providing different service quality thereby accommodating communications of different types of media, the system comprising:

a mobility manager to receive first messages from the mobile nodes, a first message including one or more measurements providing an indication of a link quality available for a mobile node on an access network to which the mobile node is affiliated;

an application server providing the communications services to the mobile nodes, the application server sending second messages to the mobility manager identifying a communications session level obtainable at the link quality available; and an access gateway included in each of the access networks for controlling access by the mobile nodes to that access network, the access gateway of each of the access networks via which the mobile nodes are communicating sending third messages to the mobility manager, the third messages providing an indication of a state of congestion of the access network with respect to a total communications bandwidth currently being used by the mobile nodes communicating via the access network in accordance with radio communications resources of a radio access interface provided by the access network currently used, wherein the mobility manager is to direct a change of access network affiliation and of the communications session level of the mobile node in accordance with one or more of the state of congestion of the access networks indicated by the third messages, the link quality currently experienced by the mobile node indicated by the first messages, the link quality indicated by the second messages, and the level of service quality to which the mobile node has subscribed.

2. The telecommunications system as claimed in claim 1, wherein the mobility manager is to determine that a second mobile node should change its affiliation from a first access network to a second access network, if the second mobile node includes a communications interface for communicating via the second access network and the third messages indicate that the first access network is in the state of congestion because there is insufficient communications bandwidth available from the first access network to support the current communications session level used by a first mobile node.

3. The telecommunications system as claimed in claim 1, wherein the mobility manager is to determine that a first mobile node should be directed to change affiliation to a first access network from a second access network, in preference to a second mobile node, the second access network providing a lower relative communications bandwidth with respect to the first access network, if the third messages indicate that a communications bandwidth is available from the first access network for supporting a communications session level to the first mobile node, and the first mobile node includes a communications interface for communicating via the first access network, and the first mobile node has subscribed to a higher quality of service level than the second mobile node.

4. The telecommunications system as claimed in claim 3, wherein the mobility manager is to determine that the first mobile node should change the affiliation from the first access network to the second access network or to reduce the communications bandwidth consumed on the first access network by changing a communications session level to a different communications session level using a lower communications bandwidth, if the second mobile node has subscribed to a higher level of service quality than the first mobile node and the communications bandwidth from the first access network used by the first mobile node has an effect of making an available communications bandwidth insufficient for the second mobile node.

5. The telecommunications system as claimed in claim 3, wherein the first mobile node and the second mobile node are affiliated with the second access network, the first mobile node is directed to change the affiliation to the first access network and the second mobile node is not.

6. A mobility manager for controlling access of a plurality of mobile nodes to a plurality of access networks providing communications services to the mobile nodes via the plurality of access networks, each of the mobile nodes subscribing to a level of service quality and is affiliated with one of the access networks, the communications services being related to mobile Internet protocol and provided within Internet protocol communications sessions having a plurality of communications session levels, each of the session levels providing different service quality thereby accommodating communications of different types of media, the mobility manager comprising: a register storing information relating to the management of the mobile node; and a processor configured to retrieve said information relating to the management of the mobile node and receive first messages from the mobile nodes, each first message including one or more measurements providing an indication of a link quality available for a mobile node on an access network to which the mobile node is affiliated;

second messages from an application server providing the communications services to the mobile nodes, the second messages identifying a communications session level obtainable at the available link quality, and third messages from the access gateway of each of the access networks via which the mobile nodes are communicating, the access gateway controlling access by the mobile nodes to the access network, the third messages providing an indication of a state of congestion of the access network with respect to a total communications bandwidth currently being used by the mobile nodes communicating via the access network in accordance with radio communications resources of a radio access interface provided by the access network currently used, wherein the processor is configured to direct a change of the access network affiliation and of the communications session level of a first mobile node in accordance with the information stored in the register and one or more of the state of congestion of access networks indicated by the third messages, the link quality currently experienced by the first mobile node indicated by the first messages, the link quality indicated by the second messages, and the level of service quality to which the mobile node has subscribed.

7. The mobility manager as claimed in claim 6, wherein the processor is configured to determine that a second mobile node should change affiliation from a first access network to a second access network, if the second mobile node includes a communications interface for communicating via the second access network and the third messages indicate that the first access network is in the state of congestion because there is insufficient communications bandwidth available from the first access network to support the current communications session level used by the first mobile node.

8. The mobility manager as claimed in claim 6, wherein the processor is configured to direct the mobile node to change affiliation to a first access network from a second access network, the second access network providing a lower relative communications link bandwidth with respect to the first access network, if the third messages received from the access gateway of the first network indicate that there are sufficient communications resources available from the first access network due to the state of congestion, the mobile node includes a communications interface for communicating via the first access network, and the applications server messages indicate that the mobile node would benefit from a higher relative communications link bandwidth.

9. A method of providing communications services to one or more mobile nodes via a plurality of access networks, each of the access networks including an access gateway for controlling access by the mobile nodes to the access networks, each mobile node subscribing to a level of service quality and is affiliated with one of the access networks, the communications services being provided within Internet protocol communications sessions having a plurality of communications session levels, each of the session levels providing different service quality thereby accommodating communications of different types of media, the method comprising acts of:

receiving first messages from the mobile nodes, a first message including one or more measurements providing an indication of a link quality available for a mobile node on an access network to which the mobile node is affiliated;

receiving second messages from an application server providing the communications services to the mobile nodes, the second messages identifying a communications session level obtainable at the available link quality;

receiving third messages from the access gateway of each of the access networks via which the mobile nodes are communicating, the access network evaluation third messages providing an indication of a state of congestion of the access network with respect to a total communications bandwidth currently being used by the mobile nodes communicating via the access network in accordance with radio communications resources of a radio access interface provided by the access network currently used; and directing a change of access network affiliation and of the communications session level of the mobile node in accordance with one or more of the state of congestion of the access networks indicated by the third messages, the link quality currently experienced by the mobile node indicated by the first messages, the link quality indicated by the second messages, and the level of service quality to which the mobile node has subscribed.

10. A non-transitory processor readable memory device having computer instructions executable by a data processor to cause the data processor to provide communications services to one or more mobile nodes via a plurality of access networks, each of the access networks including an access gateway for controlling access by the mobile nodes to the access networks, each mobile node subscribing to a level of service quality and is affiliated with one of the access networks, the communications services being provided within Internet protocol communications sessions having plurality of communications session levels, each of the session levels providing different service quality thereby accommodating communications of different types of media, said data instructions when executed by said data processor cause said data processor to perform the following:

receiving first messages from the mobile nodes, a first message containing one or more measurements providing an indication of a link quality available for a mobile node on an access network to which the mobile node is affiliated;

receiving second messages from an application server providing the communications services to the mobile nodes, the second messages identifying a communications session level obtainable at the available link quality, receiving third messages from the access gateway of each of the access networks via which the mobile nodes are communicating, the third messages providing an indication of a state of congestion of the access network with respect to a total communications bandwidth currently being used by the mobile nodes communicating via the access network in accordance with radio communications resources of a radio access interface provided by the access network currently used; and directing a change access network affiliation and of the communications session level of the first mobile node in accordance with one of the state of congestion of the access networks indicated by the third messages, the link quality currently experienced by the mobile node indicated by the first messages, the link quality indicated by the second messages, and the level of service quality to which the mobile node has subscribed.

11. An access network for providing communications services to a plurality of mobile nodes, the mobile nodes subscribing to a level of service quality and is affiliated with said access network, the communications services being provided within Internet protocol communications sessions having a plurality of communications session levels, each of the session levels providing different service quality thereby accommodating communications of different types of media, said access network comprising:

a mobility manager configured to receive from the mobile nodes first messages including one or more measurements providing an indication of a link quality available for a mobile node on said access network to which the mobile node is affiliated;

an application server configured to provide the communications services to the mobile nodes, the application server sending second messages to the mobility manager identifying a communications session level obtainable at the available link quality; and an access gateway configured to control access by the mobile nodes to said access network, the access gateway sending third messages via which the mobile nodes are communicating to the mobility manager, the third messages providing an indication of a state of congestion of said access network with respect to a total communications bandwidth currently being used by the mobile nodes communicating via said access network in accordance with radio communications resources of a radio access interface provided by the access network currently used, wherein the mobility manager is configured to direct a change of access network affiliation and of a communications session level of a first mobile node in accordance with one or more of the state of congestion of said access network indicated by the third messages, the link quality currently experienced by the first mobile node indicated by the first messages, the link quality indicated by the second messages, and the level of service quality to which the mobile node has subscribed.

\* \* \* \* \*